Patented Feb. 20, 1934

1,948,002

UNITED STATES PATENT OFFICE 1,948,002

PRODUCTION OF CARBAMATES

Alwin Mittasch and Paul Chall, Mannheim, Germany, assignors to I. G. Farbenindustrie Aktiengesellschaft, Frankfort - on - the - Main, Germany, a corporation of Germany No Drawing. Application November 30, 1929, Serial No. 410,872, and in Germany December 15, 1928

10 Claims. (Cl. 260—112)

The present invention relates to the production of carbamates.

We have found that carbamates or conversion products thereof are obtained when ammonia and carbon dioxide, or gases which contain the said reagents are introduced into solutions or suspensions of metal salts in a liquid which does not take part in the reaction, that is an inert liquid in which the metal salts are soluble at least to a slight extent, but in which the carbamates formed are insoluble or only soluble with difficulty, the compounds thus directly obtained being converted into other products if so desired. Anhydrous salts and also salts containing water may be employed for carrying out the reaction. It is recommended that the carbon dioxide or the gas mixture containing carbon dioxide be employed in excess. In many cases it is satisfactory to work at ordinary temperatures. It is advantageous to lead away the heat of the reaction by cooling. Generally speaking, the process is carried out at ordinary pressure, but it may also be suitable to employ elevated pressure.

Organic liquids may be mentioned as being eminently suitable as the solvents or suspending agents, and in particular alcohols, such as methanol, ethanol, glycerine, and other alcohols, and also formamide.

The carbamates obtained may be readily converted by heating or by other methods of treatment into other products in any known or suitable manner. When it is not desired to obtain the carbamates themselves, but to work up the products directly, for example into carbonates or bicarbonates, then a suitable amount of water is added to the solvent or suspending agent before, during or after the formation of the carbamate.

The following examples will further illustrate the nature of this invention, but the invention is not restricted to these examples.

Example 1

Calcium chloride is dissolved in methanol, and ammonia and carbon dioxide are passed into the solution at room temperature and under atmospheric pressure. Calcium carbamate separates out, and may be separated from the mother liquor by filtration. The calcium carbamate may be converted into calcium cyanamide by heating in an atmosphere of ammonia.

Example 2

Calcium nitrate is dissolved in methanol saturated with ammonia, and the solution is heated in an autoclave to about 100° C., whereupon carbon dioxide is forced in under pressure. After cooling, the crystalline calcium carbamate is filtered off. It may be further treated as described in Example 1.

Example 3

Sodium nitrate is dissolved in methanol and the solution is saturated at room temperature with ammonia. Carbon dioxide is passed in so slowly that it is completely absorbed. The sodium carbamate, of which a good yield is obtained, is filtered off by suction and washed with methanol. It can be converted in the known manner into soda or sodium cyanide.

Example 4

Lead nitrate is dissolved in methanol saturated with ammonia, and carbon dioxide or waste gas from a lime furnace is passed in as described in Example 2. Crystalline lead carbamate is obtained in a quantitative yield.

Example 5

Crystallized lead acetate is dissolved in ethanol saturated with ammonia and carbon dioxide is passed in as described in Example 2. A quantitative yield of crystalline lead carbamate is obtained.

Example 6

165 kilograms of anhydrous calcium nitrate or 110 kilograms of calcium chloride are dissolved in 1500 liters of formamide saturated with ammonia and 100 kilograms of carbon dioxide or a corresponding amount of waste gases from a lime furnace are passed in in the manner described in Example 3. Calcium carbamate is separated in a good yield and in a well crystallized form; it may be further treated in the manner described in Example 1.

What we claim is:—

1. The process of producing metal carbamates, which comprises acting with ammonia and carbon dioxide on a metal salt in an inert liquid in which the metal salt is soluble at least to a slight extent, but in which the resulting carbamate is difficultly soluble.

2. The process of producing metal carbamates, which comprises acting with ammonia and carbon dioxide on a calcium salt in an inert liquid in which the metal salt is soluble at least to a slight extent, but in which the resulting carbamate is difficultly soluble.

3. The process of producing metal carbamates, which comprises acting with ammonia and carbon dioxide on a metal salt in an alcohol.

4. The process of producing metal carbamates, which comprises acting with ammonia and carbon dioxide on a metal salt in an aliphatic alcohol having up to 3 carbon atoms.

5. The process of producing metal carbamates, which comprises acting with ammonia and carbon dioxide on a calcium salt in an aliphatic alcohol having up to 3 carbon atoms.

6. The process of producing metal carbamates, which comprises acting with ammonia and carbon dioxide on calcium nitrate in methanol.

7. The process of producing metal carbamates which comprises acting with ammonia and carbon dioxide on a salt of an alkali forming metal dispersed in an inert liquid in which said salt is soluble at least to a slight extent, but in which the resulting carbamate is difficultly soluble.

8. A process as defined in claim 7 wherein the inert liquid is an aliphatic alcohol having up to 3 carbon atoms.

9. The process of producing calcium carbamate which comprises acting with ammonia and carbon dioxide on a calcium salt dispersed in methanol.

10. The process of producing calcium carbamate which comprises treating an ammonia saturated solution of calcium nitrate in methanol with carbon dioxide at a temperature of about 100° C. and cooling the resulting mixture to precipitate the calcium carbamate.

ALWIN MITTASCH.
PAUL CHALL.